(12) United States Patent
Krasnov et al.

(10) Patent No.: US 7,056,620 B2
(45) Date of Patent: Jun. 6, 2006

(54) THIN FILM BATTERY AND METHOD OF MANUFACTURE

(75) Inventors: Victor Krasnov, Tarzana, CA (US); Kai-Wei Nieh, Monrovia, CA (US)

(73) Assignee: Front Edge Technology, Inc., Baldwin Park, CA (US)

( * ) Notice: Subject to any disclaimer, the term of this patent is extended or adjusted under 35 U.S.C. 154(b) by 593 days.

(21) Appl. No.: 09/815,886

(22) Filed: Mar. 22, 2001

(65) Prior Publication Data

US 2002/0028384 A1 Mar. 7, 2002

Related U.S. Application Data

(63) Continuation-in-part of application No. 09/656,012, filed on Sep. 7, 2000.

(51) Int. Cl.
- H01M 6/12 (2006.01)
- H01M 6/46 (2006.01)
- H01M 4/64 (2006.01)
- H01M 4/72 (2006.01)

(52) U.S. Cl. ........................ 429/162; 429/233
(58) Field of Classification Search ............... 429/162, 429/233, 236, 237, 291, 231.95
See application file for complete search history.

(56) References Cited

U.S. PATENT DOCUMENTS

| | | | |
|---|---|---|---|
| 3,530,007 A | | 9/1970 | Golubovic |
| 3,844,841 A | * | 10/1974 | Baker ........................... 429/90 |
| 3,969,142 A | * | 7/1976 | Greatbatch et al. .......... 429/159 |
| 4,309,494 A | * | 1/1982 | Stockel ........................ 429/254 |
| 4,543,441 A | | 9/1985 | Kumada et al. |
| 4,565,753 A | * | 1/1986 | Goebel et al. ................ 429/94 |
| 5,019,467 A | | 5/1991 | Fujiwara |
| 5,262,028 A | | 11/1993 | Manley |
| 5,338,625 A | | 8/1994 | Bates et al. |
| 5,445,906 A | | 8/1995 | Hobson et al. |
| 5,512,147 A | | 4/1996 | Bates et al. |

(Continued)

FOREIGN PATENT DOCUMENTS

| | | |
|---|---|---|
| FR | 2 403 652 | 4/1979 |
| JP | 59 226472 A | 12/1984 |
| JP | 2001 044073 A | 2/2001 |
| WO | WO 00 60689 A | 10/2000 |
| WO | WO 02 21627 A | 3/2002 |

OTHER PUBLICATIONS

Roh N–S, et al., "Effects of deposition condition on the ionic conductivity and structure of amorphous lithium phosphorus oxynitrate thin film" Scripta Materialia, Dec. 17, 1999, pp. 43–49, vol. 42, No. 1, Elsevier, New York, NY, US.

(Continued)

*Primary Examiner*—Patrick Ryan
*Assistant Examiner*—Julian Mercado
(74) *Attorney, Agent, or Firm*—Janah & Associates; Ashok K. Janah

(57) ABSTRACT

A battery comprises a substrate having a cathode with a lower surface contacting the substrate and an opposing upper surface. A cathode current collector comprises conducting lines that contact the upper surface of the cathode. An electrolyte at least partially extends through the cathode current collector and contacts the cathode. An anode contacts the electrolyte, and optionally, an anode current collector contacts the anode. Also, because the cathode is formed on the substrate before the cathode current collector, the cathode current collector advantageously does not have to be fabricated out of a metal that is capable of withstanding further processing of the cathode, such as annealing of the cathode.

44 Claims, 2 Drawing Sheets

U.S. PATENT DOCUMENTS

| | | | |
|---|---|---|---|
| 5,597,660 A | | 1/1997 | Bates et al. |
| 5,612,152 A | | 3/1997 | Bates |
| 5,670,272 A | * | 9/1997 | Cheu et al. .................. 429/162 |
| 5,705,293 A | | 1/1998 | Hobson |
| 5,705,297 A | | 1/1998 | Warren |
| 6,168,884 B1 | | 1/2001 | Neudecker et al. |
| 6,264,709 B1 | | 7/2001 | Yoon et al. |
| 6,280,875 B1 | | 8/2001 | Kwak et al. |
| 6,379,835 B1 | | 4/2002 | Kucherovsky et al. |

OTHER PUBLICATIONS

Bolster M–E, et al. "Investigation of lithium intercalation metal oxides for thermal batteries" Proceedings of the International Power Sources Symposium, Cherry Hill, Jun. 25–28, 1990; Jun. 25, 1990, pp. 136–140, vol. SYMP. 34, IEEE, New York, US.

Wagner A V, et al. "Fabrication and testing of thermoelectric thin film devices" Fifteenth International Conference on Thermoelectrics, Pasadena, CA, USA 26–29 Mar. 1996; Mar. 26, 1996, pp. 269–273, IEEE, New York, US.

Bates, J.B., et al. "Preferred Orientation of Polycrystalline $LiCoO_2$ Films" *Journal of the Electrochemical Society;* Issue No. 147 (1) pp. 59–70 (2000).

Neudecker, et al., "Lithium–Free Thin–Film Battery with In–Situ Plated Li Anode", Journal of the Electrochemical Society, Issue No. 147(2) 517–523 (2000).

Donald M. Mattox, Handbook of Physical Vapor Deposition (PVD) Processing, Film Formation, Adhesion, Surface Preparation and Contamination Control, 1998, pp. 127–135 and 343–364, Noyes Publications, Westwood, New Jersey, U.S.A.

* cited by examiner

THIN FILM BATTERY AND METHOD OF MANUFACTURE

CROSS-REFERENCE

The present application is a continuation-in-part of U.S. patent application Ser. No. 09/656,012, by Krasnov, et al, filed on Sep. 7, 2000, entitled "Thin Film Battery and Method of Manufacture", and which is incorporated herein by reference in its entirety.

BACKGROUND

Embodiments of the present invention relate to thin film batteries and their methods of manufacture.

A thin film battery 20 typically comprises a substrate 22 having one or more thin films 24, 26, 28 thereon, as for example, shown in FIG. 1. In a conventional thin film battery 10, typically, a cathode current collector 24 is deposited on the substrate 22, and thereafter, a cathode 26 is deposited on the cathode current collector 24. An electrolyte 28 is formed in contact with the cathode 26, and an anode (not shown) and optional anode current collector (also not shown) are on the other side of the electrolyte 28. The thin films are typically formed by thin film fabrication processes, such as for example, physical or chemical vapor deposition methods (PVD or CVD), oxidation, nitridation or electroplating, on a substrate that is has good mechanical strength. The thin film battery is typically formed by thin film processes such as physical or chemical vapor deposition methods (PVD or CVD), oxidation, nitridation, plating, or other such processes.

It is desirable for the cathode 26 to have a crystalline microstructure. When the cathode 26 comprises a thin film having an amorphous or microcrystalline structure, the energy that can be stored in such films is usually less than that stored in a microcrystalline film. Furthermore, the charge and discharge rate of the amorphous or microcrystalline film is also smaller than that of a crystalline material film with the same chemical composition. To crystallize an amorphous or microcrystalline thin film to form the cathode 26, the as-deposited thin film is annealed in a separate process step. The crystallization or annealing temperature that is required to crystallize the amorphous oxide film may be a relatively high temperature. For example, the crystalline microstructure of a thin film cathode comprising $LiCoO_2$ is dependent upon an annealing step that is conducted subsequent to deposition of an amorphous or microcrystalline thin film of $LiCoO_2$. The typical annealing temperature is about 700° C. The high temperature annealed crystalline $LiCoO_2$ provides good cathode performance, such as high energy density (0.07 $mAh/cm^2/mm$) and high charge to discharge current (more than 5 $mA/cm^2$).

Low temperature processes that produce high quality crystalline $LiCoO_2$ cathode materials have also been developed, for example, to deposit $LiCoO_2$ in at least a partially crystalline form. A 200 to 600° C. low temperature anneal process step in oxygen improves the performance such the as-deposited $LiCoO_2$ to that of a high temperature annealed cathode material.

However, in both the high and low temperature processes for making the cathode 26, oxidation of underlying cathode current collector 24 is a problem. The annealing process, which is often carried out in a flow of oxygen, limits the materials that may be used to form the underlying current collector 24 because of melting, oxidation, or inter-diffusion problems. This problem may be reduced by making the cathode current collector 24 out of a noble metal, such as Pt or Au. However, such metals increase the cost of battery 20. Also, the annealing process can generate thermal stresses due to the thermal expansion coefficient difference between the substrate 22, cathode 26, and cathode current collector 24. These stresses can result in peeling or de-lamination of these layers from the battery 20.

Thus it is desirable to have a battery having a cathode and cathode current collector capable of providing good properties, such as for example, desirable energy storage and conductor properties, respectively. It is further desirable to be able to reduce the cost of fabrication of the battery. It is also desirable to be able to minimize any thermal stresses which may be caused by annealing of thermally mismatched materials in the fabrication of the batteries.

SUMMARY

A battery comprises a substrate having a cathode thereon, the cathode having a surface. A cathode current collector comprising one or more conducting lines that contact the surface of the cathode. An electrolyte at least partially extends through the conducting lines of the cathode current collector to contact the cathode. An anode contacts the electrolyte.

A method of fabricating a battery comprises forming a substrate, forming a cathode on the substrate, the cathode having a surface, forming a cathode current collector comprising one or more conducting lines that contact the surface of the cathode, forming an electrolyte at least partially extending through the conducting line of the cathode current collector to contact the cathode, and forming an anode contacting the electrolyte.

DRAWINGS

These and other features, aspects, and advantages of the present invention will become better understood with reference to the following description, appended claims, and accompanying drawings, which illustrate embodiments of the present invention that may be used separately or in combination with one another, where:

DESCRIPTION

Figure 1:
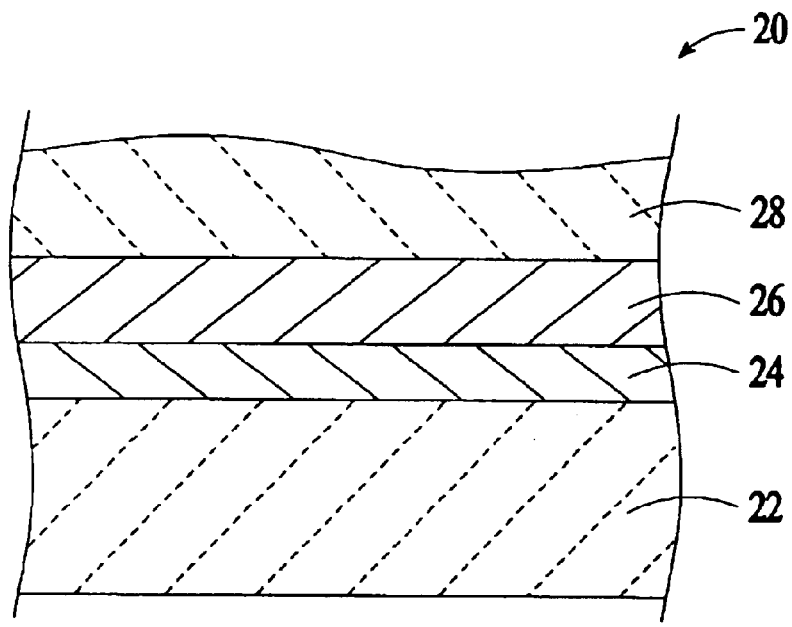
FIG. 1 (prior art) is a schematic sectional view of a conventional thin film battery.
Figure 2:
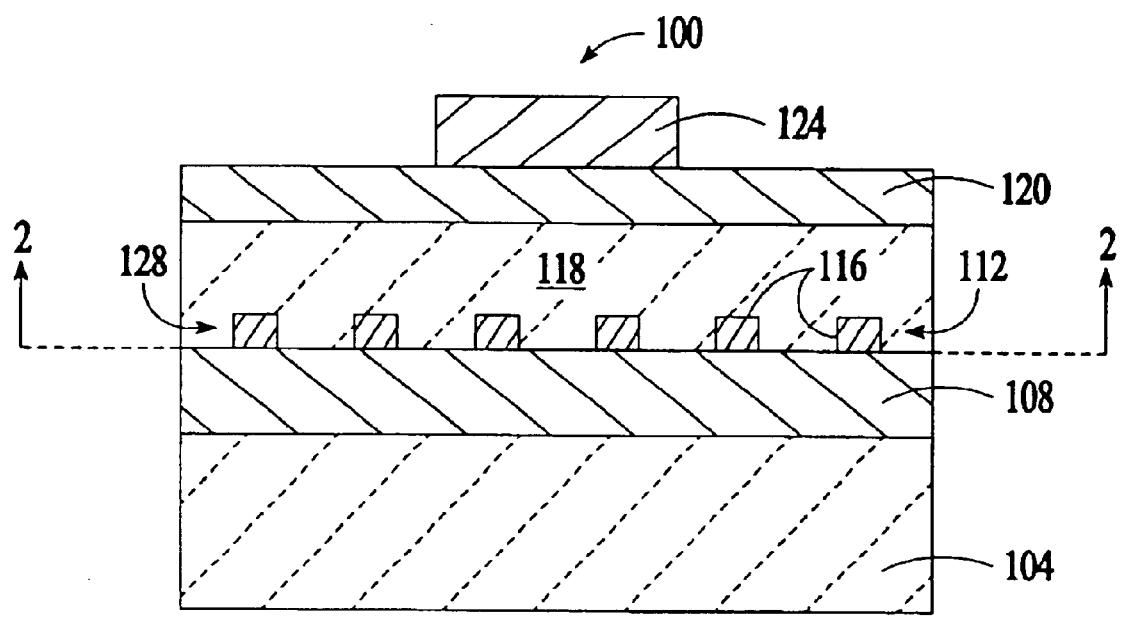
FIG. 2 is a schematic sectional side view of an embodiment of a battery according to the present invention.

An embodiment of a battery 100 having exemplary features according to the present invention is illustrated in FIG. 2. The battery 100 is formed on a substrate 104 which may be a dielectric, insulator, semiconductor, or conductor material. The substrate 104 should also have sufficient mechanical strength to support layers formed thereon during temperatures reached during processing or operation of the battery 100. Typically, the substrate 104 is a dielectric material, such as silicon dioxide, aluminum oxide, titanium, or a polymer. A preferred substrate 100 comprises mica which has good tensile strength and temperature resistance, as described in aforementioned commonly owned U.S. patent application Ser. No. 09/656,012 which is incorporated herein by reference in its entirety. In one version, the mica layer comprises a thickness of less than about 100 microns, and more preferably less than 25 microns, to reduce the weight and volume of the battery 100.

The materials deposited on the substrate 104 may have a number of different configurations, arrangements, and shapes, and should not be limited to the exemplary configurations, arrangements, and shapes, which are described herein to illustrate exemplary embodiments of the invention. Typically, the materials are deposited or otherwise formed as one or more thin films on the substrate 104. These thin films are typically thin layers that have a thickness of from about 1 to about 1000 microns. The layers may be continuous, segmented or patterned. Optionally, certain layers, such as an adhesion layer (not shown), may be deposited on the substrate 104 or on other already deposited layers, to improve the adhesion of any overlying layers. Suitable adhesion layers may be made from metal containing materials, such as, for example, titanium, cobalt, aluminum, other metals, or ceramic containing materials, such as for example, $LiCoO_x$, which may comprise a mixed stoichiometry that includes $LiCoO_2$.

In one configuration, the cathode 108 that serves as the positive electrode of the battery 100 is initially formed on the substrate 104. In this embodiment, the cathode 108 is deposited directly on the substrate 100, without an underlying current collector. The cathode 108 may comprise, for example, an electrochemically active material, such as for example, amorphous vanadium pentoxide, $V_2O_5$, or one of several intercalation compounds that may be deposited in thin-film form, such as crystalline $TiS_2$, $LiMn_2O_2$ or $LiCoO_2$. In one exemplary embodiment, the cathode 108 comprises a crystalline $LiCoO_2$ film that is formed on the substrate 104. The $LiCoO_2$ film can be deposited on the substrate at relatively low temperatures, such as below 600° C. by a PVD process, such as RF or DC magnetron sputtering of a target with a relatively high plasma density, as for example, described in aforementioned U.S. patent application Ser. No. 09/656,012, which is incorporated herein by reference in its entirety. The deposition chamber may be a vacuum chamber comprising one or more sputtering targets and a process gas distribution manifold for distributing process gases into the chamber. A mixture of argon and oxygen gases is introduced into the chamber with a total pressure of 5 to 25 mTorr and a volumetric flow rate ratio of $Ar/O_2$ of from about 1 to about 45 sccm. The target comprises a disc of $LiCoO_x$. Radio frequency (RF) sputtering of the target was performed at a power density level of 1 to 20 W/cm$^2$. Thereafter, the deposited cathode material is thermally annealed to a temperature of from about 150 to 600° C. in an annealing gas comprising ambient oxygen to crystallize the cathode material.

In one embodiment, a cathode current collector 112 is then formed on the cathode 108. The current collector 112 is typically a conductive layer, comprising, for example, a metal containing material, such as a metal, metal alloy, or metal silicide. Because such a current collector 112 may be formed after annealing of the cathode 108, many conducting metal containing materials may be used and it is no longer necessary to use only a non-reactive material. Thus, the current collector 112 may be absent a non-reactive metal containing material, such as for example, silver, gold or platinum, because it is no longer subject to an oxidizing or high temperature treatment that may be used to crystallize the cathode 108. Instead, the current collector 112 may be made from conducting reactive materials, including for example, oxidizing materials or relatively low melting point metals, such as for example, aluminum, cobalt, copper, nickel, titanium, tantalum, vanadium, zirconium, and alloys and compounds mixtures thereof. Preferred conductor materials may comprise aluminum, copper or indium-tin oxide. These metals or metal compounds are typically relatively inexpensive and thus also be advantageously used to reduce the cost of the battery 100. The residual stress is also lowered since thermal stresses that may arise from the use of metals which have high thermal expansion coefficients is also avoided. Thus, in a preferred embodiment, the metal comprises a metal that does have high thermal expansion coefficient.

The current collector 112 provides a conducting surface from which electrons may be dissipated or collected from the cathode 108. Thus, the current collector 112 is shaped to increase electron conductivity to or from the cathode 108. However, because the current collector 112 is on the side of the cathode 108 that faces an electrolyte 118 of the battery 100, it is also shaped to reduce blockage of the positive ions that move between the electrolyte and the cathode 108. Thus, the current collector 112 has the conflicting requirements of trying to have a large area in contact with the cathode 108 to increase electron transport efficiency while also trying to reduce the area that may block transport of ions between the electrolyte 118 and the cathode 108.

A suitable current collector 112 comprises one or more conducting lines 128 covering the surface of the cathode 108. In one embodiment, the conducting lines 128 are formed by placing a substrate in a sputtering process chamber (not shown), and placing on the substrate, a mask (not shown) having patterned lines etched therethrough. Conducting material is then deposited on the cathode 110 using a sputtering system similar to the one used for deposition of the cathode 110. However, the sputtering gas may be pure argon and DC instead of RF magnetron sputtering may also be used to sputter a target. The mask may be a stainless steel plate having the desired pattern of the conducting lines etched therethrough. To deposit a conducting pattern comprising copper material, the target material comprises copper and a gas comprising Ar is introduced into the chamber at a pressure of about 1 to 10 mTorr. The gas may be energized with DC energy at a power level of from about 0.5 to about 5 kw, and more preferably about 1 kw. The temperature of the substrate may be maintained at less than 100° C. This is performed for 240 seconds to deposit patterned conducting lines of copper having a thickness of about 0.3 microns on the substrate.

Figure 3:
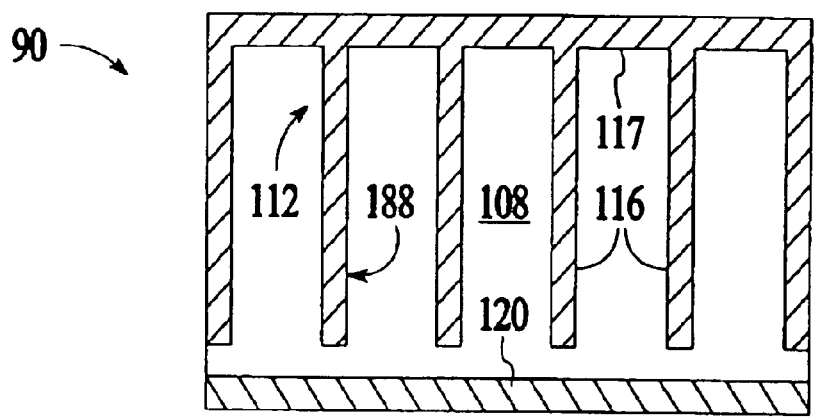
FIG. 3 is a schematic top view of the battery along section 2—2 of FIG. 1.

In one example, the conducting lines 128 are arranged to form a grid defined by a plurality of elongated prongs 116 that extend outwardly from a base prong 117, as for example, illustrated in the embodiment shown in FIG. 3. The effective resistance of a cathode 108 having such a structure for the current collector 112 is given by:

$$R_f = \frac{1}{6} \times Ri \times L/W/N2,$$

where the length of the base member 117 is 'L', the length of each elongated prong 116 is 'W', the total number of elongated prongs 116 is 'N', the thickness of the cathode 108 is 'T', and the resistivity of the cathode material is 'Ri'. For a cathode 108 comprising crystalline $LiCoO_2$ having a top surface area of 1 cm×1 cm and that is 10 micron thick, and a current collector 112 comprising 10 elongated prongs 116, the effective resistance $R_f$ is about 4 ohm.

In an exemplary embodiment, the cathode current collector 112 comprises ten elongated prongs 116 which are equally spaced apart across a rectangular shaped cathode 108 and connected to a base prong 117 that forms an edge of the cathode. In one embodiment, the effective resistance of the elongated prongs 116 is about 1.5 ohm, and each member 116 is sized about 0.1 microns thick, 0.05 mm wide, and 1 cm long. Such a current collector 112 may be made from copper. The reduction of effective area of the cathode/electrolyte interface, in this current collector structure, is only about 5%. Considering that the resistance of an electrolyte 118 comprising lithium phosphorous oxynitride having an area of 1 $cm^2$ and that is 1 micron thick, is about 50 ohm, the resistance of this current collector 112 is acceptable for many applications. For a battery 100 having a small area and that is operated at a low discharge current, the current collector 112 may comprise only the base prong 117 without the elongated prongs 116. While the internal resistance of such a battery is higher, the higher resistance does not significantly affect the battery performance because it is discharged at a relatively low current level.

Figure 4:
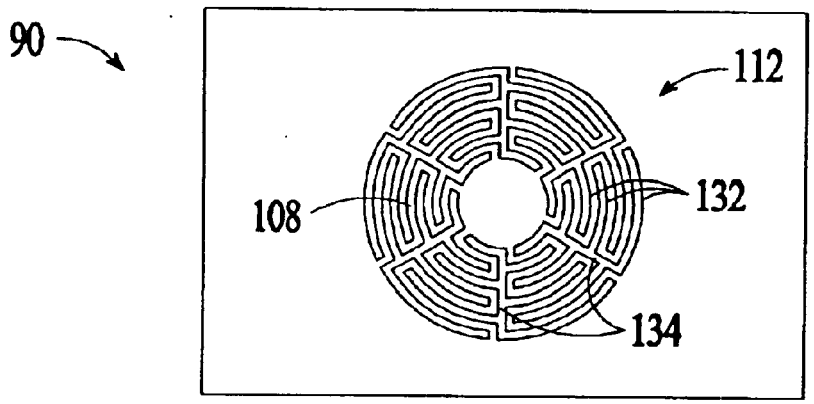
FIG. 4 is a schematic top view of another embodiment of a battery according to the present invention.

Other patterns for the conducting lines 128 can also be used, such as an arrangement of one or more of meandering lines, circular lines, random lines, radial lines, horizontal lines, vertical lines and diagonal lines. For example, FIG. 4 shows an embodiment of the current collector 112 comprising concentric arcuate lines 132 that are connected to radially extending lines 134. The concentric arcuate lines 132 extend from a number of alternating radial lines 134, and are interleaved with one another to cover a surface of the cathode 108. In one embodiment, the width of the arcuate and radial lines 132, 134, is about 0.05 mm, and the spacing between the arcuate lines 132 is about 1 mm. The electrical resistance and the surface coverage are both similar to the patterned line embodiment shown in FIG. 3.

Thereafter, an electrolyte 118 maybe formed over the cathode current collector 112, as illustrated in FIG. 2. The electrolyte 118 may comprise, for example, amorphous lithium phosphorus oxynitride material. The lithium phosphorous oxynitride is deposited over the conducting lines 128 of the current collector 112 and the exposed portions of the cathode 110. Deposition of lithium phosphorous oxynitride may be carried out in a vacuum chamber similar to that used for deposition of the cathode 110 and cathode current collector 112. For example, the lithium phosphorous oxynitride may be deposited by RF sputtering of a lithium phosphate ($Li_3PO_4$) target in pure nitrogen at a power density level of from about 1 to about 20 $W/cm^2$. The flow rate of nitrogen gas is from about 100 to about 300 sccm, and the gas is maintained at a pressure of less than about 15 mTorr, and more preferably at least about 1 mTorr. The resultant material has an ionic conductivity of $2\times10^{-6}$ S. The sample is then annealed in nitrogen or in air at 200° C. for 10 minutes to increase the ionic conductivity of electrolyte and to reduce the resistance of any interfaces.

An anode 120 that serves as the negative terminal of the battery 100 is then deposited over the electrolyte 118. The anode 120 comprises a conductor film, that may be for example, a metal film, such as a copper film, that is deposited directly on the electrolyte 118. In one version, an optional anode current collector 124 is deposited on the anode 120 (as shown). The anode 120 may also be deposited to overlap a portion of the anode current collector 124, for example, by forming the anode current collector 124 below an edge or boundary of the anode 120. The anode current collector 124 is especially useful when the anode 120 is made from a material having a relatively low conductivity. The materials used to fabricate the anode 120 and the optional anode current collector 124 may be the same as the materials used to fabricate the cathode 108 and the cathode current collector 112, respectively, or they may be materials having different conductivities. In another version, the anode 120 is made from an in-situ deposited lithium film which is sufficiently conductive to also serve as an anode current collector 124, and the two films 120, 124 are the same film. Further layers may be formed over or below the substrate 104, for example, to provide damage, environmental, or corrosion protection, the protective layers including for example, polymer, parylene, lithium phosphorous oxynitride, or copper layers.

Figure 5:
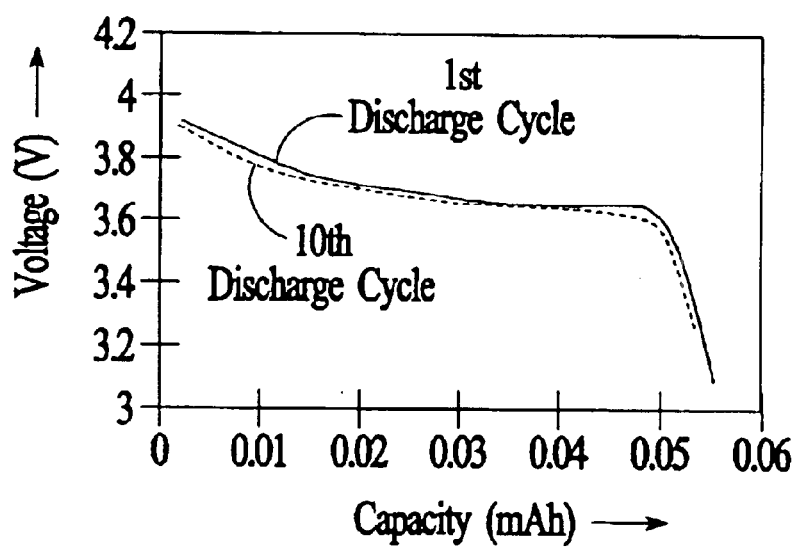
FIG. 5 is a graph showing discharge curves of an embodiment of a battery according to the present invention.

FIG. 5 is a typical discharge curve of a battery 100 having a top surface area of about 1 $cm^2$. The battery 100 comprises a substrate 104 that is a 10 m-thick layer of mica. A cathode 108 comprising crystalline $LiCoO_2$ is formed on the substrate 104, as for example, illustrated in aforementioned U.S. patent application Ser. No. 09/656,012., which is incorporated herein by reference in its entirety. The energy capacity of the battery is about 0.05 mAh. A cathode current collector 112 comprising one or more conducting lines made of 0.3 μm thick copper is formed on the cathode 108. Thereafter, an electrolyte 118 and anode 120, and the optional anode current collector 124 is formed on the substrate 104. The graph of FIG. 5 shows that the cut off voltage of the battery 100 is well defined at 3.6 Volts. After 10 charge/discharge cycles, the performance of the battery 100 is unchanged from the first charge/discharge cycle, indicating the good charging and recharging quality of the battery 100.

Although the present invention has been described in considerable detail with regard to certain preferred versions thereof, other versions would be apparent to those of ordinary skill in the art. For example, a current collector according to the present invention may be used with other types electronic devices or structures, and for other methods or purposes. Also, the structure or operation of the battery may be modified as would be apparent to one of ordinary skill in the art. Thus, the appended claims should not be limited to the description of the preferred versions contained herein.

What is claimed is:

1. A battery comprising:
   a substrate;
   a cathode on the substrate, the cathode having a surface;
   a cathode current collector comprising a plurality of conducting lines that contact the surface of the cathode, the conducting lines having spacings therebetween;
   an electrolyte at least partially extending through the spacings between the conducting lines of the cathode current collector to contact the cathode; and
   an anode contacting the electrolyte.

2. A battery according to claim 1 wherein the cathode current collector is between electrolyte and the cathode.

3. A battery according to claim 1 wherein the cathode current collector is absent a non-reactive metal containing material.

4. A battery according to claim 1 wherein the cathode current collector comprises aluminum, cobalt, copper, nickel, titanium, tantalum, vanadium, zirconium, indium-tin oxide, and alloys and compounds mixtures thereof.

5. A battery according to claim 1 wherein the conducting lines comprise elongated prongs extending from a base prong.

6. A battery according to claim 1 wherein the conducting lines contact less than 80% of the area of the surface of the cathode.

7. A battery according to claim 1 wherein the substrate comprises mica.

8. A battery according to claim 1 wherein the cathode comprises lithium cobalt oxide.

9. A battery according to claim 1 comprising an anode current collector contacting the anode.

10. A battery according to claim 1 wherein the plurality of conducting lines comprise one or more of meandering lines, circular lines, random lines, radial lines, horizontal lines, vertical lines, diagnolal lines and arcuate lines 11. A thin film battery comprising:
a substrate comprising a dielectric material;
a cathode layer having a surface adhering to the substrate and an opposing surface;
a cathode current collector layer comprising one or more conducting lines adhering to the opposing surface of the cathode layer, the conducting lines having spacings therebetween or thereabout;
an anode layer facing the opposing surface of the cathode layer and the cathode current collector layer; and
an electrolyte layer between the cathode current collector layer, cathode layer and anode layer, the electrolyte layer at least partially extending through the spacings between or about the one or more conducting lines of the cathode current collector layer to contact the opposing surfae of the cathode layer.

12. A battery according to claim 11 wherein the cathode current collector comprises aluminum, cobalt, copper, nickel, titanium, tantalum, vanadium, zirconlium, indium-tin oxide, and alloys and compounds mixtures thereof.

13. A battery according to claim 11 wherein the conducting lines comprise elongated prongs extending from a base prong.

14. A battery according to claim 11 wherein the substrate comprises mica.

15. A battery according to claim 14 wherein the cathode comprises lithium cobalt oxide.

16. A battery comprising:
a substrate;
a cathode having a surface on the substrate and an opposing surface;
a cathode current collector comprising a pattern of conducting lines contacting the opposing surace of the cathode, the conducting lines having spacings therebetween;
an anode; and
an electrolyte between the cathode and anode, the electrolyte at least partially extending through the spacings between the conducting lines.

17. A battery according to claim 16 wherein the pattern of conducting lines comprise one or more of meandering lines, circular lines, random lines, radial lines, horizontal lines, vertical lines, diagnolal lines and arcuate lines.

18. A battery according to claim 16 wherein the substrate comprises mica.

19. A battery according to claim 16 wherein the cathode comprises lithium cobalt oxide.

20. A battery comprising:
a substrate;
a cathode on the substrate, the cathode having a surface;
a cathode current colletor contacting the surface of the cathode, the cathode current collector comprising conducting lines having a plurality of elongated prongs extending outwardly from a base prong, the elongated prongs having spacings therebetween;
an electrolyte at least partially extending through the spacings between the elongated prongs of the cathode current collector to the contact the cathode; and
an anode contacting the electrolyte. substrate comprises mica.

21. A battery according to claim 20 wherein the substrate comprises mica.

22. A battery according to claim 20 wherein the cathode comprises lithium cobalt oxide.

23. A battery according to claim 20 wherein the electrolyte comprises lithium phosphorus oxynitride.

24. A battery according to claim 20 wherein the cathode current collector comprises one or more of cooper, aluminum and indium tin oxide.

25. A battery comprising:
a substrate;
a cathode comprising lithium cobalt oxide, the cathode having a surace on the substrate and an opposing surface;
a cathode current collector contacting the opposing surface of the cathode, the cathode current collector comprising conducting lines having a plurality of elongated prongs extending outwardly from a base prong, the elongated prongs having spacings therebetween, the cathode current collector comprising one or more of copper, aluminum, and indium tin oxide;
an electrolyte comprising lithium phosphorus osynitride at least partially extending through the spacings between the elongated prongs of the cathode current collector to contact the opposing surface of the cathode; and
an anode facing the opposing surface of the cathode and contacting the electrolyte.

26. A battery according to claim 25 wherein the substrate comprises mica.

27. A battery comprising:
a substrate;
a cathode having a surface on the substrate and an opposing surface;
a cathode current collector contacting the opposing surface of the cathode, the cathode current collector comprising a patten of conductors having a plurality of shapes with spacing therebetween, the plurality of shapes comprising one or more different shapes;
an electrolyte at least partially extending through the spacings between the shapes of the pattern of conductors of the cathode current collector to contact the opposing surface of the cathode; and
an anode contacting the electrolyte.

28. A battery according to claim 27 wherein the substrate comprises mica.

29. A battery according to claim 27 wherein the cathode comprises lithium cobalt oxide.

30. A battery according to claim 27 wherein the electrolyte comprises lithium phosphorus oxynitride.

31. A battery according to claim 27 wherein the cathode current collector comprises one or more of copper, aluminum and indium in oxide.

32. A battery comprising:
a substrate;
a cathode having a surface on the substrate and an opposing surface;
a cathode current collector contacting the opposing surface of the cathode, the cathode current collector comprising a layer having spacins therein;
an electrolyte at least partially extending through the spacings in the cathode current collector layer to contat the opposing suface of the cathode; and
an anode contacting the electrolyte.

33. A battery according to claim 32 wherein the layer is continuous.

34. A battery according to claim 32 wherein the substrate comprises mica.

35. A battery according to claim 32 wherein the cathode comprises lithium cobalt oxide.

36. A battery according to claim 32 wherein the electrolyte comprises lithium phosphorus oxynitride.

37. A battery according to claim 32 wherein the cathode current collector comprises one or more of copper, aluminum and indium in oxide.

38. A battery comprising:

a substrate;

a cathode having a surface on the substrate and an opposing surface;

a cathode current collector contacting the opposing surfae of the cathode, the cathode current collector comprising a single continuous conducting line having portions with spacings therebetween;

an electrolyte at least partially extending through the spacings between portions of the conducting line of the cathode current collector to contact the opposing surface of the cathode; and an anode contacting the electrolyte.

39. A battery according to claim 38 wherein the conducting line comprises concentric arcuate portions.

40. A battery according to claim 38 wherein the cathode current collector covers substantially the entire cathode opposing surface.

41. A battery according to claim 38 wherein the substrate comprises mica.

42. A battery according to claim 38 wherein the cathode comprises lithium cobalt oxide.

43. A battery according to claim 38 wherein the electrolyte comprises lithium phosphorus oxynitride.

44. A battery according to claim 38 wherein the cathode current collector comprises one or more of copper, aluminum and indium tin oxide.

* * * * *